United States Patent Office 2,836,609
Patented May 27, 1958

2,836,609

STABILIZED FUEL ANTIKNOCK

Alfred J. Kolka, Birmingham, and George G. Ecke, Detroit, Mich., assignors to Ethyl Corporation, New York, N. Y., a corporation of Delaware No Drawing. Application March 21, 1955
Serial No. 495,800

3 Claims. (Cl. 260—437)

This invention relates to the stabilization of lead antiknock compounds and fluids containing them.

It is known that tetraalkyllead antiknock compounds such as tetraethyllead and also concentrated antiknock fluids containing organic halide scavengers mixed with such compounds deteriorate in the presence of oxygen, air, or ozone. This deterioration is wasteful and costly. When it occurs before, during, or after blending with gasoline—even oxygen-insensitive gasoline—secondary problems arise. For example, octane quality of the fuel is impaired because not all of the antiknock agent originally present or assumed to be present is capable of exerting its desired function. Moreover, decomposition products of tetraalkyllead compounds are insoluble sludges and residues which can ultimately clog fuel lines, induction systems, carburetor parts, and the like. While certain stabilizers have been suggested heretofore to prevent this deterioration, none of these has been adopted in commercial application except in special cases. The reason for this is that prior stabilizers for one or more reasons have been impractical or ineffective.

An object of our invention is to provide means for preventing the decomposition of tetraalkyllead antiknock compositions. Another object is to provide concentrated antiknock material which is stable on storage. Other objects will be apparent from the ensuing description.

The above and other objects are accomplished by providing an antiknock composition wherein the principal antiknock ingredient is a tetraalkyllead antiknock compound and, as a stabilizer therefor, a small amount of 2-isopropyl-6-t-butylphenol. Such antiknock compositions preferably contain a scavenger complement, although this is not essential to the present invention since it is often desired to store a tetraalkyllead compound in substantially pure state for long periods of time. This invention makes this possible by virtually eliminating oxidative deterioration of the lead alkyl material.

The particular amount of 2-isopropyl-6-t-butylphenol used in the various embodiments of this invention is dependent upon several factors. Thus, the amount used is governed by: (1) the type of conditions or service to be encountered; that is, the temperatures and fluctuations thereof and the amount of oxygen, air, and/or ozone encountered during storage, handling, or use; (2) the chemical makeup of the particular scavenger complement used, since it is well known that certain effective scavengers bring about a greater degree of instability than others; and (3) the type of fuel in which the concentrated antiknock fluid composition is to be blended. Generally speaking, amounts between about 0.01 and about 2.0 percent by weight of the lead alkyl antiknock compound are satisfactory, although greater or lesser amounts may be employed under varying conditions such as those enumerated above. Thus, we use an amount of 2-isopropyl-6-t-butylphenol which is sufficient to inhibit deterioration of the antiknock composition in which it is employed when such compositions are placed in contact with air.

2-isopropyl-6-t-butylphenol can be prepared by making use of a selective ortho-alkylation reaction involving the use of a phenoxide catalyst. More particularly, 2-isopropyl-6-t-butylphenol can be prepared by reacting one mole of propylene per mole of phenol at a temperature of about 180° C. and at an initial pressure of about 50 p. s. i. gauge in the presence of about 5 percent by weight of aluminum phenoxide based on the amount of phenol used in the reaction. 2-isopropylphenol is isolated from the reaction mixture and then reacted with a stoichiometric equivalent of isobutylene at a temperature of 100° C. and under an initial pressure of about 20 p. s. i. gauge using about 5 percent of the aluminum phenoxide catalyst based on the amount of 2-isopropylphenol used in the reaction.

The tetraalkyllead antiknock agents which are stabilized according to our invention are represented by such compounds as tetramethyllead, tetraethyllead, tetrapropyllead, dimethyldiethyllead, trimethylethyllead, and the like, or mixtures thereof. Such compounds containing from 4 to about 12 carbon atoms, one atom of lead and a plurality of lead-to-carbon bonds, are capable of increasing the octane quality of gasoline when employed therein in antiknock quantities—0.5 to 6.5 grams of lead per gallon. Halogen-containing compounds such as triethyllead bromide may also be stabilized according to this invention.

The scavengers which are preferably, but not necessarily, present in the compositions of this invention are organic halide compounds which react with the lead during combustion in the engine to form volatile lead halide. The halogen of these scavengers has an atomic weight between 35 and 80; that is, the active scavenging ingredient is chlorine and/or bromine. Such scavengers include carbon tetrachloride, propylene dibromide, 2-chloro-2,3-dibromobutane, 1,2,3-tribromopropane, hexachloropropylene, mixed bromoxylenes, 1,4-dibromobutane, 1,4-dichloropentane, $\beta,\beta'$-dibromodiisopropyl ether, $\beta,\beta'$-dichlorodiethyl ether, trichlorobenzene, dibromotoluenes, and in general those disclosed in U. S. Patents 1,592,954; 1,668,022; 2,364,921; 2,479,900; 2,479,901; 2,479,902; 2,479,903; and 2,496,983. In short, we prefer to employ scavengers containing only elements selected from the group consisting of carbon, hydrogen, bromine, chlorine, and oxygen. The amount of scavenger used is from about 0.5 to about 2.0 theories, a theory being defined as the quantity required to react with the lead to form lead halide—i. e. 2 atoms of halogen per atom of lead. When we use mixtures of bromine-containing and chlorine-containing scavengers, particularly bromo- and chlorohydrocarbons, we can employ concentrations and proportions as described in U. S. Patent 2,398,281. Such concentrations are sufficient to control the amount of deposits formed in the engine.

Representative tetraalkyllead antiknock compositions of this invention are presented in the following table. The figures following the representative ingredients are parts by weight. The two figures following the stabilizing ingredient, 2-isopropyl-6-t-butylphenol, show respectively the amounts which are used to obtain a composition containing 0.1 and 1.0 percent by weight of stabilizer based on the lead alkyl antiknock agent. It will be apparent that if the lower figure is halved, the resulting composition will contain 0.05 percent by weight of the stabilizing ingredient based on the lead alkyl, whereas doubling the second figure will provide a composition containing 2.0 percent. Should other concentrations be desired, the proper adjustments are evident.

*Antiknock fluid compositions*

| Antiknock Agent | Scavenger | Stabilizer |
|---|---|---|
| Tetramethyllead 267 | None | 2-isopropyl-6-t-butyl phenol 0.27-2.67. |
| Do | Ethylene dibromide 226. | Do. |
| Do | Ethylene dibromide 94 and ethylene dichloride 99. | Do. |
| Tetraethyllead 323 | None | 2-isopropyl-6-t-butyl-phenol 0.32-3.23. |
| Do | Ethylene dibromide 188. | Do. |
| Do | Ethylene dibromide 94 and ethylene dichloride 99. | Do. |
| Do | Mixed Dibromotoluenes 200. | Do. |
| Do | Mixed Dibromotoluenes 125 and ethylene dichloride 99. | Do. |
| Do | Mixed Dibromotoluenes 150 and 1,2,4-trichlorobenzenes 175. | Do. |
| Do | Ethylene dibromide 94 and mixed trichlorobenzenes 146. | Do. |
| Do | 1,4-Dibromobutane 216. | Do. |
| Do | 1,4-Dibromobutane 108 and 1,4-Dichlorobutane 127. | Do. |
| Tetrapropyllead 379 | Acetylene tetrabromide 346. | 2-isopropyl-6-t-butyl-phenol 0.38-3.79. |
| Dimethyldiethyllead 295. | $\beta,\beta'$-Dibromodiethyl ether 232. | 2-isopropyl-6-t-butyl-phenol 0.30-2.95. |
| Methyltriethyllead 309. | $\beta,\beta'$-Dibromodiisopropyl ether 130 and $\beta,\beta'$-Dichlorodiethyl ether 143. | 2-isopropyl-6-t-butyl-phenol 0.31-3.09. |

The antiknock fluid compositions shown in the above table are presented for illustrative purposes only. Other such compositions will be apparent to one skilled in the art. In all instances, the presence of 2-isopropyl-6-t-butylphenol enhances the stability characteristics of the formulation over those prevailing in the absence of our stabilizer.

To demonstrate the benefits resulting from our invention, various test procedures are available. One method is an accelerated test procedure involving use of a stainless steel bomb. Antiknock fluid compositions of this invention and the corresponding compositions not containing our stabilizer are added at a given concentration to separate portions of a stable hydrocarbon fuel of the gasoline boiling range. This fuel is stable against oxidative deterioration; that is, does not tend to form gum even under the conditions of the test. More particularly, a fluid of this invention is blended with a stable aviation fuel of 115-145 grade in the amount such that the lead content is 0.13 gram per 100 milliliters. An identical sample is prepared with the exception that our stabilizer is absent. These fuels are then placed in the stainless steel bomb which is then sealed and charged with oxygen at an initial pressure of 100 p. s. i. gauge.

The bombs are then maintained at a temperature of 100° C. for a period of 16 hours. After cooling to room temperature, the bomb is opened and the contents transferred to a glass container. Virtually no change in the fuel containing our fluid composition has occurred, whereas the unprotected composition contains a heavy precipitate or sludge.

Another method of demonstrating the benefits of this invention is to conduct storage test procedures. For example, antiknock fluid compositions of this invention and comparable formulations not containing our stabilizer are placed in glass or cold rolled steel containers which are then stored at a constant temperature of 122° F. under air. Periodic inspection and analysis of the samples shows that the unprotected antiknock fluid compositions continually deteriorate with the formation of insoluble sludges and other decomposition products, whereas those formulations of this invention remain practically unchanged.

Other benefits are obtained by the use of 2-isopropyl-6-t-butylphenol as a tetraalkyllead stablizer. For example, the nature of 2-isopropyl-6-t-butylphenol is such that it does not contribute to troublesome deposits, even under severe engine operating conditions, in the induction systems of modern high volumetric efficiency engines of the spark ignition type. High temperature and low temperature storage characteristics of our tetraalkyllead antiknock compositions are also improved when compared to the characteristics of unprotected antiknock fluids.

The tetraalkyllead antiknock compositions of this invention may contain other ingredients such as dyes for identification purposes, metal deactivators, diluents, and the like.

As stated hereinabove, the compositions of this invention are generally used in gasoline in amount such that there is from about 0.5 to about 6.5 grams of lead per gallon.

We claim:
1. An antiknock composition wherein the principal antiknock ingredient is a tetraalkyllead antiknock compound and, as a stabilizer therefor, a small amount of 2-isopropyl-6-t-butylphenol.
2. The composition of claim 1 in which said tetraalkyllead antiknock compound is tetraethyllead.
3. 2-isopropyl-6-t-butylphenol.

References Cited in the file of this patent

UNITED STATES PATENTS

| 2,361,337 | Walters | Oct. 24, 1944 |
| 2,459,597 | Stillson et al. | Jan. 18, 1949 |
| 2,514,960 | Luten et al. | July 11, 1950 |
| 2,705,240 | Rosenwald | Mar. 29, 1955 |

OTHER REFERENCES

Industrial and Engineering Chemistry, vol. 42, No. 1, pages 162-165 (1950).